United States Patent
Nadeau

(10) Patent No.: US 6,401,570 B1
(45) Date of Patent: Jun. 11, 2002

(54) CABLE STRIPPING TOOL

(76) Inventor: Frank D. Nadeau, 251 E. Ricker Rd., Chichester, NH (US) 03234

( * ) Notice: Subject to any disclaimer, the term of this patent is extended or adjusted under 35 U.S.C. 154(b) by 0 days.

(21) Appl. No.: 09/692,640

(22) Filed: Oct. 18, 2000

(51) Int. Cl.[7] ............................................... H02G 1/12
(52) U.S. Cl. ............................................ 81/9.4; 30/90.4
(58) Field of Search ................... 81/9.4, 9.51; 30/90.4; 220/273, 274

(56) References Cited

U.S. PATENT DOCUMENTS 4,651,891 A * 3/1987 Urech ......................... 220/274
5,230,260 A * 7/1993 Bell .............................. 81/9.4

* cited by examiner

Primary Examiner—James G. Smith
Assistant Examiner—Hadi Shakeri
(74) Attorney, Agent, or Firm—Klein & Szekeres, LLP

(57) ABSTRACT

A cable stripping tool, for stripping insulation from a cable that includes a stripper cord, includes a cylindrical mandrel having first and second ends, with a cord end receptacle formed in at least one end. The receptacle is dimensioned to receive the exposed end of a stripper cord. In use, the exposed end of the stripper cord is inserted into the receptacle, and the mandrel is rotated about its longitudinal axis, thereby pulling the stripper cord through the insulation layer. When the desired point is reached along the length of the cable, the cord is cut. The coil of cord that becomes wrapped around the mandrel may be cut axially to remove the cord from the tool. In a preferred embodiment, the mandrel is formed as a hollow tubular extrusion, with a longitudinal slot along its entire length. Alternatively, the mandrel can be formed as a solid rod of material, with a longitudinal slot formed along its length. The cord end receptacle is formed as a notch in at least one end, and preferably both ends, of the mandrel. If two notches are provided, they lie along the same diameter so as to be parallel with each other. The slot is located so that the slot and the notch define a diameter of the mandrel. The slot, which is wide enough to receive a knife blade, provides a guide for the blade when the blade is used to cut the coiled cord from the mandrel.

12 Claims, 1 Drawing Sheet

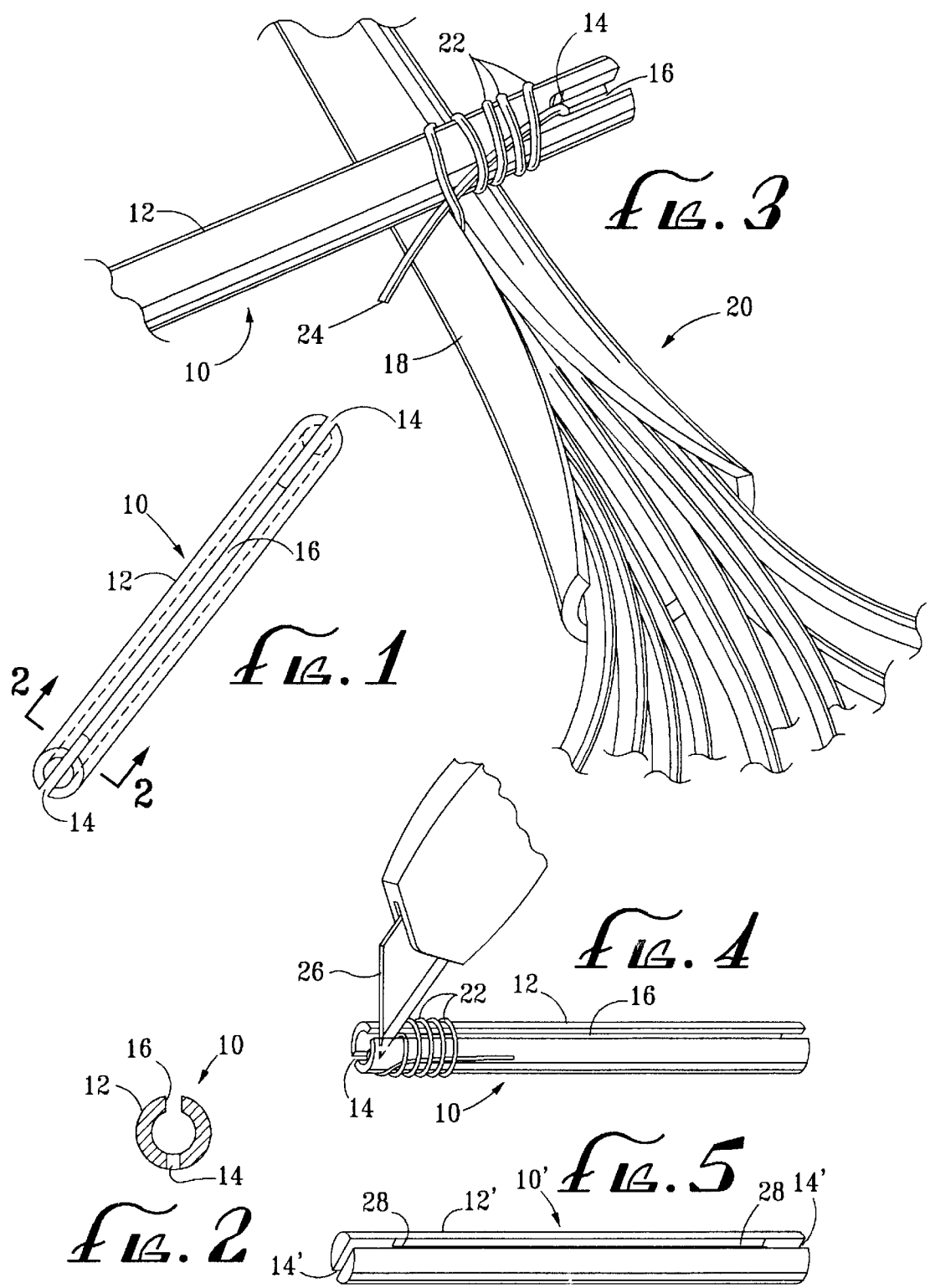

CABLE STRIPPING TOOL

CROSS-REFERENCE TO RELATED APPLICATIONS

Not Applicable

FEDERALLY SPONSORED RESEARCH AND DEVELOPMENT

Not Applicable

BACKGROUND OF THE INVENTION

The present invention relates to the field of tools and implements. More specifically, it relates to the field of tools and implements for stripping insulation from wires and cables.

Those who work with optical and multi-conductor copper cables often need to strip the insulation from the ends of the cable to connect the wires or fibers contained in the cable to appropriate connectors or terminals. Typically, this is done with a knife or a blade of some sort. This procedure may be cumbersome in certain circumstances, especially where the work is being done under conditions that make it difficult to achieve the requisite degree of finesse to remove the insulation without damaging the wires or cables.

To help remedy this situation, many cables are now being made with a stripper cord in the insulation layer. This stripper cord is a string that lies longitudinally within the insulation layer. When the cable is cut, an end of the stripper cord is exposed. The exposed end may be grasped with an available tool, such as a pliers, and pulled longitudinally through the insulation layer, until the desired point is reached along the length of the cable. Preferably, there are two diametrically opposed stripper cords that are separately pulled through the insulation to facilitate the peeling back of the insulation layer. At the desired point, the exposed length of the cord and the peeled length of insulation may be cut off.

The stripper cord arrangement is helpful, but still it may prove awkward under certain conditions. Therefore, a better arrangement has been sought that would make it easier to strip the insulation from the cable.

SUMMARY OF THE INVENTION

Broadly, the present invention is a cable stripping tool, comprising an elongate, substantially cylindrical member or mandrel having first and second ends, with a cord end receptacle formed in at least one end of the mandrel. The receptacle is dimensioned to receive the exposed end of a stripper cord. In use, the exposed end of the stripper cord is inserted into the receptacle, and the mandrel is grasped by the worker and rotated about its longitudinal axis. The rotation of the mandrel pulls the stripper cord through the insulation layer. When the desired point is reached along the length of the cable, the cord is cut. Advantageously, the coil of cord that becomes wrapped around the mandrel can be cut axially, thereby quickly freeing the mandrel from the cord to allow the tool to be quickly redeployed to remove the other stripper cord (if present).

In a preferred embodiment, the mandrel is formed as a hollow tubular extrusion (e.g., of a durable plastic), with a longitudinal slot along its entire length from the first end to the second end. The cord end receptacle is formed as a diametric notch in at least one of the first and second ends, and preferably both ends to minimize the manipulation required to use the tool. If two notches are provided, they lie along the same diameter so as to be parallel with each other. The slot extends longitudinally along the length of the mandrel and is circumferentially located so as to be diametrically opposed to the notches. In other words a diameter drawn through an end of the mandrel passes through the slot and the notch at that end. The slot, which is wide enough to receive a knife blade, provides a guide for the blade when the blade is used to cut the coiled cord from the mandrel.

Alternatively, the mandrel can be formed as a solid rod of metal, plastic, or wood, with a longitudinal slot formed along its length. There may be two diametrically-opposed longitudinal slots, if desired. Each such slot is dimensioned to provide the knife blade guiding function provided by the slot in the above-described preferred embodiment.

It will thus be appreciated that the present invention provides a tool that allows the quick, convenient, and easy stripping of insulation from a cable. Furthermore, the present invention is simple and inexpensive to manufacture.

BRIEF DESCRIPTION OF THE DRAWINGS

FIG. 1 is a perspective view of a cable stripping tool in accordance with the preferred embodiment of the invention;

FIG. 2 is a cross-sectional view taken along line 2—2 of FIG. 1;

FIG. 3 is a detailed perspective view showing the cable stripping tool of FIG. 1 in use for stripping the insulation from a cable;

FIG. 4 is a perspective view showing the step of removing the stripper cord from the cable stripping tool of FIG. 1 after insulation stripping step of FIG. 3 has been performed; and FIG. 5 is a perspective view of a cable stripping tool in accordance with an alternative embodiment of the invention.

DETAILED DESCRIPTION OF THE INVENTION

Referring first to FIGS. 1 and 2, a cable stripping tool 10, in accordance with a preferred embodiment of the present invention, is shown. The tool 10 comprises an elongate, hollow, substantially cylindrical member or mandrel 12, preferably formed as a hollow, tubular extrusion or molding of a suitable durable plastic. The mandrel has first and second opposed ends, near at least one of which a cord end receptacle is formed. In the preferred embodiment, the cord end receptacle is a diametric notch 14. Preferably, a diametric notch 14 is formed in each of the first and second ends, to minimize the manipulation required to use the tool 10. If two notches 14 are provided, they lie along the same diameter so as to be parallel with each other. The notches 14 have a width large enough easily to receive the stripper cord of a typical cable, as discussed below.

A longitudinal slot 16 is formed along the entire length of the mandrel 12, circumferentially located so as to be diametrically opposed to the notches 14. In other words, the slot 16 is circumferentially positioned so that the slot 16 and the notch 14 define a diameter at the end of the mandrel 12 containing the notch. The slot 16 is wide enough to receive a typical knife blade, and it thus provides a guide for the blade when the tool 10 is used in the manner described below.

The use of the tool 10 is illustrated in FIGS. 3 and 4. In FIG. 3, the tool 10 is shown being used to strip an insulation layer 18 from a cable 20 that has at least one stripper cord 22. The cord 22 has a free end 24 that is exposed from a cut end of the cable 20. The free cord end 24 is inserted through one of the notches 14. The mandrel 12 is then grasped by a worker and rotated about its longitudinal axis away from the cut end of the cable. The rotation of the mandrel 12 pulls the stripper cord 22 through the insulation layer 18. When the desired length of insulation is stripped along the length of the cable 20, the cord 22 is cut to separate the portion of the cord coiled around the mandrel 12 from the portion of the cord 22 remaining in the cable.

As shown in FIG. 4, the portion of the cord 22 wrapped around the mandrel 12 is the removed from the mandrel 12 by inserting a cutting blade, such as a knife blade 26, into the slot 16 and passing it along the slot, thereby cutting the cord 22. The mandrel 12 can then be used on the second stripper cord (not shown) on the cable 20, or it can be used on another cable.

FIG. 5 shows a cable stripper tool 10' in accordance with an alternative embodiment of the invention. In this embodiment, the tool 10' comprises a mandrel 12' formed as a substantially cylindrical rod of metal, plastic or wood having first and second ends, with a diametric notch 14' formed near at least one of the ends. A longitudinal slot 28 is formed along the entire length of the mandrel 12', and it is circumferentially located so that it defines a diameter through the end of the mandrel 12' with the notch 14' at that end. The slot 28 is wide enough to receive the knife blade 26, and it thus provides a guide for the blade 26 when the tool 10' is used in the manner described above in connection with the preferred embodiment. Two such slots 28, diametrically-opposed, may be provided, if desired.

There has thus been described a new and useful cable stripping tool that is easy and simple to use and economical to manufacture. While exemplary embodiments of the invention have been shown and described herein, it will be understood that a number of variations and modifications will suggest themselves to those skilled in the pertinent arts. For example, instead of the diametric notches, the cord end receptacle can be formed as a diametric bore near at least one of the ends of the mandrel. Such variations and modifications should be considered within the spirit and scope of the invention, as defined in the claims that follow.

What is claimed is:

1. A tool for stripping insulation from a cable, comprising:
    an elongate, substantially cylindrical mandrel having first and second ends and a circumference;
    a cord end receptacle formed near at least one of the first and second ends of the mandrel; and
    a longitudinal slot formed along the length of the mandrel and circumferentially located so that the slot and the cord end receptacle define a diameter of the mandrel.

2. The tool defined in claim 1, wherein the cord end receptacle is a notch in at least one of the first and second ends.

3. The tool defined in claim 1, wherein the mandrel is a hollow, tubular member.

4. The tool defined in claim 1, wherein a cord end receptacle is formed in both of the first and second ends.

5. The tool defined in claim 1, wherein the mandrel is a solid rod of a material selected from the group consisting of metal, wood, and plastic.

6. The tool defined in claim 3, wherein the cord end receptacle is a notch in at least one end of the mandrel, and wherein the slot is circumferentially located so as to be diametrically opposed to the notch.

7. The tool defined in claim 6, wherein the cord end receptacle comprises a notch in each of the first and second ends formed along the same diameter of the mandrel.

8. A tool for stripping insulation from a cable having a stripper cord, comprising:
    an elongate tubular cylindrical mandrel having first and second ends, and a circumference;
    a notch formed in at least one of the first and second ends and dimensioned to receive the stripper cord; and
    a longitudinal slot along the length of the mandrel and circumferentially located on the mandrel so as to be diametrically opposed to the notch.

9. The tool defined in claim 8, where the notch is a first notch in the first end of the mandrel, the tool further comprising a second notch, substantially parallel to the first notch, in the second end of the mandrel.

10. The tool defined in claim 8, wherein the mandrel is a hollow, tubular member.

11. The tool defined in claim 10, wherein the mandrel is formed a plastic extrusion.

12. A tool for stripping insulation from a cable having a stripper cord, comprising:
    an elongate, substantially cylindrical mandrel having first and second ends, and a circumference;
    a notch formed in at least one of the first and second ends and dimensioned to receive the stripper cord; and
    a longitudinal axial slot formed along the length of the mandrel and circumferentially located on the mandrel so that the notch and the slot define a diameter in the end of the mandrel.

* * * * *